(12) United States Patent
Harris et al.

(10) Patent No.: US 9,217,111 B2
(45) Date of Patent: *Dec. 22, 2015

(54) PROCESS FOR CONVERTING A SOLID BIOMASS MATERIAL

(75) Inventors: John William Harris, Amsterdam (NL); Sander Van Paasen, Amsterdam (NL); Johan Willem Gosselink, Amsterdam (NL); Colin John Schaverien, Amsterdam (NL); Nicolaas Wilhelmus Joseph Way, Amsterdam (NL); Andries Hendrik Janssen, Amsterdam (NL)

(73) Assignee: Shell Oil Company, Houston, TX (US)

( * ) Notice: Subject to any disclaimer, the term of this patent is extended or adjusted under 35 U.S.C. 154(b) by 902 days.

This patent is subject to a terminal disclaimer.

(21) Appl. No.: 13/453,850

(22) Filed: Apr. 23, 2012

(65) Prior Publication Data

US 2013/0109892 A1 May 2, 2013

(30) Foreign Application Priority Data

Apr. 21, 2011 (EP) .................................. 11163436

(51) Int. Cl.
*C07C 1/00* (2006.01)
*C10G 1/10* (2006.01)
(Continued)

(52) U.S. Cl.
CPC ............... *C10G 1/10* (2013.01); *B01J 8/0055* (2013.01); *B01J 8/1827* (2013.01); *B01J 8/1863* (2013.01); *C10B 49/22* (2013.01); *C10B 53/02* (2013.01); *C10B 57/06* (2013.01); *C10G 1/08* (2013.01); *C10G 3/57* (2013.01); *C10G 11/18* (2013.01); *C10L 1/02* (2013.01); *C10G 2300/104* (2013.01); *C10G 2300/1014* (2013.01); *C10G 2300/1044* (2013.01); *C10G 2300/1051* (2013.01); *C10G 2300/1055* (2013.01); *C10G 2300/4075* (2013.01); *C10G 2300/807* (2013.01); *Y02E 50/14* (2013.01)

(58) Field of Classification Search
CPC ............. B01J 8/32; C10G 1/065; C10G 3/42; C10G 2300/1011; C10G 2300/101; C10G 11/18
USPC .................. 422/145, 146, 144; 585/240, 242; 44/605, 606
See application file for complete search history.

(56) References Cited

U.S. PATENT DOCUMENTS 3,502,574 A 3/1970 Baillie
3,639,228 A * 2/1972 Carr et al. ..................... 208/153
(Continued)

FOREIGN PATENT DOCUMENTS

CN 1270984 10/2000
CN 101558135 10/2009
(Continued)

OTHER PUBLICATIONS

Lappas, A.A., et al.; "Biomass Pyrolysis in a Circulating Fluid Bed Reactor for Production of Fuels and Chemicals"; Fuel, vol. 81; pp. 2087-2095, 2002.
(Continued)

*Primary Examiner* — Nina Bhat (57) ABSTRACT

A process for converting a solid biomass material by contacting the solid biomass material with a catalytic cracking catalyst at a temperature of more than 400° C. in a riser reactor to produce one or more cracked products is provided, wherein the riser reactor is an internal riser reactor.

11 Claims, 1 Drawing Sheet

(51) Int. Cl.

| | |
|---|---|
| *B01J 8/00* | (2006.01) |
| *B01J 8/18* | (2006.01) |
| *C10B 49/22* | (2006.01) |
| *C10B 53/02* | (2006.01) |
| *C10B 57/06* | (2006.01) |
| *C10G 1/08* | (2006.01) |
| *C10G 3/00* | (2006.01) |
| *C10G 11/18* | (2006.01) |
| *C10L 1/02* | (2006.01) |

(56) References Cited

U.S. PATENT DOCUMENTS

| | | | |
|---|---|---|---|
| 4,435,279 A | 3/1984 | Busch et al. | |
| 4,851,109 A | 7/1989 | Chen et al. | 208/58 |
| 4,876,108 A | 10/1989 | Underwood et al. | |
| 5,580,442 A | 12/1996 | Kwon et al. | |
| 5,622,677 A * | 4/1997 | Hadjigeorge | 422/144 |
| 6,652,815 B1 * | 11/2003 | Sattar | 422/145 |
| 7,369,294 B2 | 5/2008 | Gally et al. | |
| 8,003,835 B2 | 8/2011 | Yanik et al. | |
| 8,013,195 B2 | 9/2011 | McCall et al. | |
| 8,063,258 B2 | 11/2011 | Bartek et al. | |
| 8,207,385 B2 | 6/2012 | O'Connor et al. | |
| 8,288,599 B2 | 10/2012 | Yanik et al. | |
| 8,288,600 B2 | 10/2012 | Bartek et al. | |
| 8,349,170 B2 * | 1/2013 | Tammera et al. | 208/113 |
| 8,455,705 B2 | 6/2013 | Cortright et al. | |
| 8,524,960 B2 | 9/2013 | O'Connor et al. | |
| 8,748,680 B2 | 6/2014 | Hogendoorn et al. | |
| 2008/0022595 A1 | 1/2008 | Lemaire et al. | |
| 2008/0035526 A1 | 2/2008 | Hedrick et al. | |
| 2008/0216655 A1 | 9/2008 | Vimalchand et al. | |
| 2009/0013603 A1 | 1/2009 | Rolland | |
| 2009/0026112 A1 | 1/2009 | Dierickx et al. | |
| 2009/0253948 A1 | 10/2009 | McCall et al. | |
| 2009/0283445 A1 | 11/2009 | Tammera et al. | |
| 2010/0076096 A1 * | 3/2010 | Calis et al. | 518/702 |
| 2010/0105970 A1 | 4/2010 | Yanik et al. | |
| 2010/0163455 A1 | 7/2010 | Hadjigeorge et al. | |
| 2010/0222620 A1 | 9/2010 | O'Connor et al. | |
| 2011/0138681 A1 | 6/2011 | Ramirez Corredores et al. | |
| 2011/0154720 A1 * | 6/2011 | Bartek et al. | 44/307 |
| 2011/0224471 A1 | 9/2011 | Wormsbecher et al. | |
| 2012/0022307 A1 | 1/2012 | Yanik et al. | |
| 2012/0160741 A1 | 6/2012 | Gong et al. | |
| 2012/0198756 A1 | 8/2012 | O'Connor et al. | |

FOREIGN PATENT DOCUMENTS

| | | | |
|---|---|---|---|
| CN | 101824330 | 9/2010 | |
| EP | 2166663 | 5/1986 | |
| EP | 0231163 | 8/1987 | |
| EP | 0321305 | 6/1989 | C10G 45/62 |
| EP | EP699225 | 11/1994 | C10G 65/12 |
| EP | EP705321 | 1/1995 | C10G 45/10 |
| EP | 649896 | 4/1995 | C10G 65/12 |
| EP | 0668342 | 8/1995 | |
| EP | 994173 | 4/2000 | C10G 65/12 |
| EP | 1892280 | 2/2008 | |
| EP | 1903019 | 11/2008 | |
| EP | 2053114 | 4/2009 | |
| EP | 2107100 | 10/2009 | |
| EP | 2108637 | 10/2009 | |
| GB | 2371807 | 7/2002 | C10G 50/00 |
| GB | 2386607 | 9/2003 | |
| GB | 2447684 | 9/2008 | |
| WO | 9206848 | 4/1992 | |
| WO | 9321139 | 10/1993 | |
| WO | 9426848 | 11/1994 | |
| WO | 9500604 | 1/1995 | |
| WO | 9600060 | 1/1996 | |
| WO | 9718278 | 5/1997 | |
| WO | WO9718278 | 5/1997 | C10G 47/00 |
| WO | 02070630 | 9/2002 | |
| WO | WO 2005080531 | * 9/2005 | |
| WO | 2006031011 | 3/2006 | |
| WO | 2006121212 | 11/2006 | |
| WO | 2007090884 | 8/2007 | |
| WO | WO2007090884 | 8/2007 | C10G 3/00 |
| WO | 2008022595 | 2/2008 | |
| WO | 2009143017 | 11/2009 | |
| WO | 2010002792 | 1/2010 | |
| WO | 2010062611 | 6/2010 | |
| WO | 2010068255 | 6/2010 | |
| WO | WO2010062611 | 6/2010 | C10G 1/08 |
| WO | 2010135734 | 11/2010 | |
| WO | WO2010135734 | 11/2010 | C07C 1/00 |

OTHER PUBLICATIONS

Schoenmakers, P.J. et al; "Comparison of Comprehensive Two-Dimensional Gas Chromatography and Gas Chromatography—Mass Spectrometry for the Characterization of Complex Hydrocarbon Mixtures"; Journal of Chromatography A; 892 pp. 29-46; Jun. 30, 2000.

Wilson, Joseph; "Flue Gas System" Fluid Catalytic Cracking Technology and Operations; Chapter 3, pp. 101-112, copyright 1997.

Sadeghbeigi, R.; "Fluid Catalytic Cracking; Design, Operation and Troubleshooting of FCC Facilities";, p. 5; 1995.

Magee, J.S. et al.; "Fluid Catalytic Cracking: Science and Technology"; p. 391; 1993.

Meier, W.M. et al.; "Atlas of Zeolite Structure Types"; Fourth Revised Edition 1996, ISBN 0-444-10015-6; pp. 1-235.

"Fluid Catalytic Cracking technology and operations", by Joseph W. Wilson, published by PennWell Publishing Company (1997), pp. 14 to 18, and chapter 8, especially pp. 223 to 235.

Ancilotti, F. et al., "MTBE from Butadiene-Rich C4s", Hydrocarbon Processing,1987, pp. 50-53.

Corma, A. et al., "Processing Biomass-Derived Osygenates in the Oil Refinery: Catalytic Cracking (FCC) Reaction Pathways and Role of Catalyst", Journal of Catalysis, 2007, vol. 247, pp. 307-327.

Fogassy, G. et al., "Biomass Derived Feedstock Co-Processing With Vacuum Gas Oil for Second-Generation Fuel Production in FCC Units", Applied Catalysis B: Environmental, Elsevier, NL, vol. 96, Nos. 3-4, 2010, pp. 476-485.

French, R. et al., "Catalytic Pyrolysis of Biomass for Biofuels Production", Fuel Processing Technology, Elsevier, NL, vol. 91, No. 1, 2010, pp. 25-32.

Huber, G. W. et al., "Biorefineries-Synergies between Bio and Oil Refineries for the Production of Fuels from Biomass", Angewandte Chemie International Ed., (2007) vol. 46; pp. 7184-7201.

Lappas, A.A. et al., "Biomass Pyrolysis in a Circulating Fluid Bed Reactor for the Production of Fuels and Chemicals", 2002, Fuel, vol. 81, pp. 2087-2095.

Lee, Kyung-Hae, et al., "Influence of Reaction Temperature, Pretreatment, and a Char Removal System on the Production of Bio-oil from Rice Straw by Fast Pyrolysis, Using a Fluidized Bed", Energy & Fuels, vol. 19, No. 5, 2005, pp. 2179-2184.

Magee, J. S. et al ., "Fluid Catalytic Cracking", Science & Technology, 1993, p. 391.

Meirer, W.M. et al., "Atlas of Zeolite Structure Types", 4th Rev. ED, Zeolites vol. 17:A1-A6, 1996, pp. 1-230.

Wilson, J.W., Fluid Catalytic Cracking Technology and Operations,1997, Chapter 4, pp. 1131-1155.

Wilson, J.W., "Reactor Transfer Line"; Fluid Catalytic Cracking Technology & Operations, 1997, Chapter 8, pp. 223-235.

Wilson, J.W., "Riser/Reactor Design and Operation", Fluid Catalytic Cracking Technology & Operations, 1997 Chapter 3, pp. 101-112.

Wilson, J.W., "Riser Termination", Fluid Catalytic Cracking Technology & Operations, 1997, Chapter 3, pp. 104-120 & Chapter 6, pp. 186-194.

Zhang, Q. et al., "Review of Biomass Pyrolysis Oil Properties and Upgrading Research", Energy Conversion and Management, 2007, vol. 48, pp. 87-92.

European Search Report of Nov. 17, 2011 for Ref. No. TS2645 EPC B, Application No. 11163411.9-2104.

(56) References Cited

OTHER PUBLICATIONS

PCT International Search Report mailed Jul. 25, 2012 for Ref. No. TS 2623 PCT, International Application No. PCT/EP2012/057414 filed Apr. 23, 2012.

PCT Written Opinion of the International Searching Authority, Form PCT/ISA/210 mailed Jul. 9, 2012 for Application No. PCT/EP2012/057415 filed Apr. 23, 2012, priority date Apr. 21, 2011.

State Intellectual Property Office of the People's Republic of China report dated Jul. 22, 2014, for related case Ref. TS2619-CN-PCT, Chinese Application No. 201280027753.0 (equiv to US20120277499).

State Intellectual Property Office of the People's Republic of China report dated Aug. 5, 2014, for related case Ref. TS2627-CN-PCT, Chinese Application No. 201280027542.7 (equiv. To US20120271075).

State Intellectual Property Office of the People's Republic of China report dated Feb. 15, 2015, 2nd Office Action, for related case Ref. TS2627-CN-PCT, Chinese Application No. 201280027542.7 (equiv. to US20120271075).

\* cited by examiner

PROCESS FOR CONVERTING A SOLID BIOMASS MATERIAL

The present application claims the benefit of European Patent Application No. 11163436.6, filed Apr. 21, 2011 the entire disclosure of which is hereby incorporated by reference.

FIELD OF THE INVENTION

The invention relates to a process for converting a solid biomass material and a process for producing a biofuel and/or biochemical.

BACKGROUND TO THE INVENTION

With the diminishing supply of crude mineral oil, use of renewable energy sources is becoming increasingly important for the production of liquid fuels. These fuels from renewable energy sources are often referred to as biofuels.

Biofuels derived from non-edible renewable energy sources, such as cellulosic materials, are preferred as these do not compete with food production. These biofuels are also referred to as second generation, renewable or advanced, biofuels. Most non-edible renewable energy sources, however, are solid materials that are cumbersome to convert into liquid fuels.

For example, the process described in WO 2010/062611 for converting solid biomass to hydrocarbons requires three catalytic conversion steps. First the solid biomass is contacted with a catalyst in a first riser operated at a temperature in the range of from about 50 to about 200° C. to produce a first biomass-catalyst mixture and a first product comprising hydrocarbons (referred to as pretreatment). Hereafter the first biomass-catalyst mixture is charged to a second riser operated at a temperature in the range of from about 200° to about 400° C. to thereby produce a second biomass-catalyst mixture and a second product comprising hydrocarbons (referred to as deoxygenating and cracking); and finally the second biomass-catalyst mixture is charged to a third riser operated at a temperature greater than about 450° C. to thereby produce a spent catalyst and a third product comprising hydrocarbons. The last step is referred to as conversion to produce the fuel or specialty chemical product. WO 2010/062611 mentions the possibility of preparing the biomass for co-processing in conventional petroleum refinery units. The process of WO 2010/062611, however, is cumbersome in that three steps are needed, each step requiring its own specific catalyst.

WO2010/135734 describes a method for co-processing a biomass feedstock and a refinery feedstock in a refinery unit comprising catalytically cracking the biomass feedstock and the refinery feedstock in a refinery unit comprising a fluidized reactor, wherein hydrogen is transferred from the refinery feedstock to carbon and oxygen of the biomass feedstock. In one of the embodiments WO2010/135734 the biomass feedstock comprises a plurality of solid biomass particles having an average size between 50 and 1000 microns. In passing, it is further mentioned that solid biomass particles can be pre-processed to increase brittleness, susceptibility to catalytic conversion (e.g. by roasting, toasting, and/or torrefication) and/or susceptibility to mixing with a petrochemical feedstock.

In the article titled "Biomass pyrolysis in a circulating fluid bed reactor for production of fuels and chemicals" by A. A. Lappas et al, published in Fuel, vol. 81 (2002), pages 2087-2095, an approach for biomass flash pyrolysis in a circulating fluid bed (CFB) reactor is described. The CFB reactor comprised a vertical riser type reactor (7.08 mm ID). The riser height was 165 cm. From FIG. 1, the riser reactor appears to be an essentially vertical external riser reactor connected via an essentially horizontal cross-over with a stripper vessel. In all experiments lignocell HBS 150-500 supplied by Rettenmaier GmbH (particle size 200-400 micrometer) was used as biomass feedstock. In the conventional biomass pyrolysis tests silica sand was used as a heat carrier. Catalytic biomass pyrolysis was performed using a commercial equilibrium FCC catalyst supplied by a Greek refinery. The Biomass pyrolysis experiments were performed at riser temperatures in the range of 400-500° C. Each biomass pyrolysis run required 2 hour for the line out and the heating up of the unit and 3 hours of a steady state operation. Lappas et al. do not disclose a so-called internal riser reactor, where an essentially vertical upstream end is located outside a vessel and an essentially vertical downstream end is located inside a vessel.

It would be an advancement in the art to improve the above processes further. For example, in order to scale up the catalytic cracking of the solid biomass feedstock to a commercial scale, the process may require improvements to meet nowadays conversion, robustness maintenance and/or safety requirements.

SUMMARY OF THE INVENTION

Such an improvement has been achieved with the process according to the invention. It has been found that by feeding a solid biomass material to an internal riser reactor a safer process that may be operated for a longer period can be obtained.

Accordingly one embodiment provides a process for converting a solid biomass material, comprising contacting the solid biomass material with a catalytic cracking catalyst at a temperature of more than 400° C. in a riser reactor to produce at least one cracked product, wherein the riser reactor is an internal riser reactor.

The internal riser reactor advantageously avoids any horizontal flow in the riser.

The cracked product produced by the process above can be used as an intermediate to prepare a biofuel and/or biochemical component.

The biofuel and/or biochemical component(s) may be further converted to and/or blended with one or more further components into novel biofuels and/or biochemicals.

The process according to the invention may therefore also provide a more direct route via catalytic cracking of solid biomass material to second generation, renewable or advanced, biofuels and/or biochemicals.

DETAILED DESCRIPTION OF THE INVENTION

Without wishing to be bound by any kind of theory, it is believed that when connecting an upstream external riser reactor with a downstream cross-over pipe in a 90 degrees junction (as described by Lappas et al.) turbulence will be created in the junction.

It has now for the first time been recognized that such turbulence may cause a problem when a solid biomass material is converted. For example, any unconverted solid biomass material particles may cause erosion and/or abrasion of the hardware due to the above described turbulence.

In addition unconverted solid biomass material particles may increase the fouling in a reactor, especially in a downstream cross-over pipe. The fouling with unconverted solid biomass material and/or additional coke due to the conversion of a solid biomass material may cause resistance and/or (partial or whole) blockage of the downstream cross-over pipe. This in turn may effect the plug flow behaviour in the riser reactor, the robustness and/or the reliability of the process.

The use of an internal riser reactor may allow one to reduce erosion, fouling and/or (partial or whole) blockage due to unconverted solid biomass material, thereby increasing safety, hardware integrity, robustness and/or reliability of the process.

In the process according to the invention the solid biomass material may be converted into an intermediate oil product (herein also referred to as pyrolysis oil) which intermediate oil product in turn can be cracked into one or more cracked products.

Such an intermediate oil product and/or such one or more cracked products may be more prone to polymerization than conventional oils due to oxygen-containing hydrocarbons and/or olefins that may be present in the intermediate oil product and/or in the one or more cracked products. In addition the intermediate oil product may be more corrosive than conventional oils due to oxygen-containing hydrocarbons that may be present.

The use of an internal riser reactor also allows one to reduce the risk of plugging due to polymerization and/or to reduce the risk of corrosion, thereby increasing safety and hardware integrity. This can in turn allow for prolonged operating times and/or larger periods between maintenance services.

The process according to the invention can be simple and may require a minimum of processing steps to convert a solid biomass material to a biofuel component or biochemical component. Such biofuel component or biochemical component can be fully fungible.

Furthermore the process according to the invention can be easily implemented in existing refineries.

In addition, the process according to the invention does not need any complicated actions, for example it does not need a pre-mixed composition of the solid biomass material and the catalyst.

By a solid biomass material is herein understood a solid material obtained from a renewable source. By a renewable source is herein understood a composition of matter of biological origin as opposed to a composition of matter obtained or derived from petroleum, natural gas or coal. Without wishing to be bound by any kind of theory it is believed that such material obtained from a renewable source may preferably contain carbon-14 isotope in an abundance of about 0.0000000001%, based on total moles of carbon.

Preferably the renewable source is a composition of matter of cellulosic or lignocellulosic origin. Any solid biomass material may be used in the process of the invention. In a preferred embodiment the solid biomass material is not a material used for food production. Examples of preferred solid biomass materials include aquatic plants and algae, agricultural waste and/or forestry waste and/or paper waste and/or plant material obtained from domestic waste.

Preferably the solid biomass material contains cellulose and/or lignocellulose. Examples of suitable cellulose-containing and/or lignocellulose-containing materials include agricultural wastes such as corn stover, soybean stover, corn cobs, rice straw, rice hulls, oat hulls, corn fibre, cereal straws such as wheat, barley, rye and oat straw; grasses; forestry products and/or forestry residues such as wood and wood-related materials such as sawdust; waste paper; sugar processing residues such as bagasse and beet pulp; or mixtures thereof. More preferably the solid biomass material is selected from the group consisting of wood, sawdust, straw, grass, bagasse, corn stover and/or mixtures thereof.

The solid biomass material may have undergone drying, torrefaction, steam explosion, particle size reduction, densification and/or pelletization before being contacted with the catalyst, to allow for improved process operability and economics.

Preferably the solid biomass material is a torrefied solid biomass material. In a preferred embodiment the process according to the invention comprises a step of torrefying the solid biomass material at a temperature of more than 200° C. to produce a torrefied solid biomass material that is subsequently contacted with the catalytic cracking catalyst.

By torrefying (also herein referred to as torrefaction) is herein understood the treatment of the solid biomass material at a temperature in the range from equal to or more than 200° C. to equal to or less than 350° C. in the essential absence of a catalyst and in an oxygen-poor, preferably an oxygen-free, atmosphere. By an oxygen-poor atmosphere is understood an atmosphere containing equal to or less than 15 vol. % oxygen, preferably equal to or less than 10 vol. % oxygen and more preferably equal to or less than 5 vol. % oxygen. By an oxygen-free atmosphere is understood that the torrefaction is carried out in the essential absence of oxygen.

Torrefying of the solid biomass material is preferably carried out at a temperature of more than 200° C., more preferably at a temperature equal to or more than 210° C., still more preferably at a temperature equal to or more than 220° C., yet more preferably at a temperature equal to or more than 230° C. In addition torrefying of the solid biomass material is preferably carried out at a temperature less than 350° C., more preferably at a temperature equal to or less than 330° C., still more preferably at a temperature equal to or less than 310° C., yet more preferably at a temperature equal to or less than 300° C.

Torrefaction of the solid biomass material is preferably carried out in the essential absence of oxygen. More preferably the torrefaction is carried under an inert atmosphere, containing for example inert gases such as nitrogen, carbon dioxide and/or steam; and/or under a reducing atmosphere in the presence of a reducing gas such as hydrogen, gaseous hydrocarbons such as methane and ethane or carbon monoxide.

The torrefying step may be carried out at a wide range of pressures. Preferably, however, the torrefying step is carried out at atmospheric pressure (about 1 bar absolute, corresponding to about 0.1 MegaPascal).

The torrefying step may be carried out batchwise or continuously.

The torrefied solid biomass material has a higher energy density, a higher mass density and greater flowability, making it easier to transport, pelletize and/or store. Being more brittle, it can be easier reduced into smaller particles.

Preferably the torrefied solid biomass material has an oxygen content in the range from equal to or more than 10 wt %, more preferably equal to or more than 20 wt % and most preferably equal to or more than 30 wt % oxygen, to equal to or less than 60 wt %, more preferably equal to or less than 50 wt %, based on total weight of dry matter (i.e. essentially water-free matter).

In a further preferred embodiment, any torrefying or torrefaction step further comprises drying the solid biomass material before such solid biomass material is torrefied. In such a drying step, the solid biomass material is preferably dried until the solid biomass material has a moisture content in the range of equal to or more than 0.1 wt % to equal to or less than 25 wt %, more preferably in the range of equal to or more than 5 wt % to equal to or less than 20 wt %, and most preferably in the range of equal to or more than 5 wt % to equal to or less than 15 wt %. For practical purposes moisture content can be determined via ASTM E1756-01 Standard Test method for Determination of Total solids in Biomass. In this method the loss of weight during drying is a measure for the original moisture content.

Preferably the solid biomass material is a micronized solid biomass material. By a micronized solid biomass material is herein understood a solid biomass material that has a particle size distribution with a mean particle size in the range from equal to or more than 5 micrometer to equal to or less than 5000 micrometer, as measured with a laser scattering particle size distribution analyzer. In a preferred embodiment the process according to the invention comprises a step of reducing the particle size of the solid biomass material, optionally before or after such solid biomass material is torrefied. Such a particle size reduction step may for example be especially advantageous when the solid biomass material comprises wood or torrefied wood. The particle size of the, optionally torrefied, solid biomass material can be reduced in any manner known to the skilled person to be suitable for this purpose. Suitable methods for particle size reduction include crushing, grinding and/or milling. The particle size reduction may preferably be achieved by means of a ball mill, hammer mill, (knife) shredder, chipper, knife grid, or cutter.

Preferably the solid biomass material has a particle size distribution where the mean particle size lies in the range from equal to or more than 5 micrometer (micron), more preferably equal to or more than 10 micrometer, even more preferably equal to or more than 20 micrometer, and most preferably equal to or more than 100 micrometer to equal to or less than 5000 micrometer, more preferably equal to or less than 1000 micrometer and most preferably equal to or less than 500 micrometer.

Most preferably the solid biomass material has a particle size distribution where the mean particle size is equal to or more than 100 micrometer to avoid blocking of pipelines and/or nozzles. Most preferably the solid biomass material has a particle size distribution where the mean particle size is equal to or less than 3000 micrometer to allow easy injection into the riser reactor.

For practical purposes the particle size distribution and mean particle size of the solid biomass material can be determined with a Laser Scattering Particle Size Distribution Analyzer, preferably a Horiba LA950, according to the ISO 13320 method titled "Particle size analysis—Laser diffraction methods".

Hence, preferably the process of the invention comprises a step of reducing the particle size of the solid biomass material, optionally before and/or after torrefaction, to generate a particle size distribution having a mean particle size in the range from equal to or more than 5, more preferably equal to or more than 10 micron, and most preferably equal to or more than 20 micron, to equal to or less than 5000 micron, more preferably equal to or less than 1000 micrometer and most preferably equal to or less than 500 micrometer to produce a micronized, optionally torrefied, solid biomass material.

In an optional embodiment the particle size reduction of the, optionally torrefied, solid biomass material is carried out whilst having the solid biomass material suspended in a hydrocarbon-containing liquid and/or water, to improve processibility and/or avoid dusting. Most preferably such a hydrocarbon-containing liquid is the same as the fluid hydrocarbon feed described herein below. Examples of suitable hydrocarbon-containing liquids include straight run (atmospheric) gas oils, flashed distillate, vacuum gas oils (VGO), coker gas oils, gasoline, naphtha, diesel, kerosene, atmospheric residue ("long residue") and vacuum residue ("short residue") and/or mixtures thereof. Most preferably the hydrocarbon-containing liquid comprises gasoline, naphtha, diesel, kerosene, and/or mixtures thereof.

In a preferred embodiment the, optionally micronized and/or optionally torrefied, solid biomass material is dried before being supplied to the riser reactor. Hence, if the solid biomass material is torrefied, it may be dried before and/or after torrefaction. If dried before use as a feed to the riser reactor, the solid biomass material is preferably dried at a temperature in the range from equal to or more than 50° C. to equal to or less than 200° C., more preferably in the range from equal to or more than 80° C. to equal to or less than 150° C. The, optionally micronized and/or optionally torrefied, solid biomass material is preferably dried for a period in the range from equal to or more than 30 minutes to equal to or less than 2 days, more preferably for a period in the range from equal to or more than 2 hours to equal to or less than 24 hours.

In addition to the, optionally micronized and/or optionally torrefied, solid biomass material also a fluid hydrocarbon feed (herein also referred to as fluid hydrocarbon co-feed) may be co-feeded into the riser reactor.

The fluid hydrocarbon feed may be supplied to the riser reactor in any manner known to the skilled person in the art. For example the fluid hydrocarbon feed and the, optionally micronized and/or optionally torrefied, solid biomass material can be mixed prior to entry into the riser reactor or they can be added separately, at the same location or different locations to the riser reactor.

In one embodiment the fluid hydrocarbon feed and the, optionally micronized and/or torrefied, solid biomass material are not mixed together prior to entry into the riser reactor. In this embodiment the fluid hydrocarbon feed and the solid biomass material may be fed simultaneously (that is at one location) to the riser reactor, and optionally mixed upon entry of the riser reactor; or, alternatively, the fluid hydrocarbon feed and the solid biomass material may be added separately (at different locations) to the riser reactor. Riser reactors can have multiple feed inlet nozzles. The solid biomass material and the fluid hydrocarbon feed can therefore be processed in the riser reactor even if both components are not miscible, by feeding each component through a separate feed inlet nozzle.

For example, in one preferred embodiment the solid biomass material is introduced to the riser reactor at a location downstream of a location where a fluid hydrocarbon feed is introduced to the riser reactor. Without wishing to be bound by any kind of theory it is believed that by allowing the fluid hydrocarbon feed to contact the catalytic cracking catalyst first, hydrogen may be generated. The availability of this hydrogen may assist in the reduction of coke formation when the solid biomass material is contacted with the catalytic cracking catalyst more downstream in the riser reactor.

In another preferred embodiment, the solid biomass material is preferably introduced into the riser reactor at a location upstream of a location where the, fluid hydrocarbon feed is introduced. This advantageously allows for a longer residence time for the solid biomass material. In addition the solid biomass material can take advantage of the higher temperature and higher catalyst to feed weight ratio at that location.

In another embodiment the fluid hydrocarbon feed and the solid biomass material are mixed together prior to entry into the riser reactor to provide a slurry feed comprising the fluid hydrocarbon feed and the solid biomass material. This advantageously allows for easier feeding of the solid biomass material to the riser reactor. An example of such a slurry is the suspended second particulate product comprising solid biomass particles suspended in a hydrocarbon-containing liquid described above.

By a hydrocarbon feed is herein understood a feed that contains one or more hydrocarbon compounds. By a hydrocarbon compound is herein understood a compound that contains both hydrogen and carbon and preferably consists of hydrogen and carbon. By a fluid hydrocarbon feed is herein understood a hydrocarbon feed that is not in a solid state. More specifically a fluid hydrocarbon feed is herein understood to be a hydrocarbon feed that is not in a solid state when contacted with the catalytic cracking catalyst. The fluid hydrocarbon feed is preferably a liquid hydrocarbon feed, a gaseous hydrocarbon feed, or a mixture thereof. The fluid hydrocarbon feed can be fed to a catalytic cracking reactor (like the internal riser reactor) in an essentially liquid state, in an essentially gaseous state or in a partially liquid-partially gaseous state. When entering the reactor in an essentially or partially liquid state, the fluid hydrocarbon feed preferably vaporizes upon entry and preferably is contacted in the gaseous state with the catalytic cracking catalyst and/or the solid biomass material.

For fluid hydrocarbon feeds that are highly viscous, it may be advantageous to preheat such feeds before entering the catalytic cracking reactor. For example, fluid hydrocarbon feeds such as a long residue, a vacuum gas oil and/or mixtures thereof may be preheated to a temperature equal to or above 250° C.

The fluid hydrocarbon feed can be any non-solid hydrocarbon feed known to the skilled person to be suitable as a feed for a catalytic cracking unit. The fluid hydrocarbon feed can for example be obtained from a conventional crude oil (also sometimes referred to as a petroleum oil or mineral oil), an unconventional crude oil (that is, oil produced or extracted using techniques other than the traditional oil well method) or a renewable oil (that is, oil derived from a renewable source, such as pyrolysis oil, liquefied biomass and/or vegetable oil), a Fisher Tropsch oil (sometimes also referred to as a synthetic oil) and/or a mixture of any of these.

In one embodiment the fluid hydrocarbon feed is derived from a, preferably conventional, crude oil. Examples of conventional crude oils include West Texas Intermediate crude oil, Brent crude oil, Dubai-Oman crude oil, Arabian Light crude oil, Midway Sunset crude oil or Tapis crude oil.

More preferably the fluid hydrocarbon feed comprises a fraction of a, preferably conventional, crude oil or renewable oil. Preferred fluid hydrocarbon feeds include straight run (atmospheric) gas oils, flashed distillate, vacuum gas oils (VGO), coker gas oils, diesel, gasoline, kerosene, naphtha, liquefied petroleum gases, atmospheric residue ("long residue") and vacuum residue ("short residue") and/or mixtures thereof. Most preferably the fluid hydrocarbon feed comprises a long residue and/or a vacuum gas oil.

In one embodiment the fluid hydrocarbon feed preferably has a 5 wt % boiling point at a pressure of 1 bar absolute (0.1 MegaPascal), as measured by means of distillation as based on ASTM D86 titled "Standard Test Method for Distillation of Petroleum Products at Atmospheric Pressure", respectively as measured by on ASTM D1160 titled "Standard Test Method for Distillation of Petroleum Products at Reduced Pressure", of equal to or more than 100° C., more preferably equal to or more than 150° C. An example of such a fluid hydrocarbon feed is vacuum gas oil.

In a second embodiment the fluid hydrocarbon feed preferably has a 5 wt % boiling point at a pressure of 1 bar absolute (0.1 MegaPascal), as measured by means of distillation based on ASTM D86 titled "Standard Test Method for Distillation of Petroleum Products at Atmospheric Pressure", respectively as measured by on ASTM D1160 titled "Standard Test Method for Distillation of Petroleum Products at Reduced Pressure", of equal to or more than 200° C., more preferably equal to or more than 220° C., most preferably equal to or more than 240° C. An example of such a fluid hydrocarbon feed is long residue.

In a further preferred embodiment equal to or more than 70 wt %, preferably equal to or more than 80 wt %, more preferably equal to or more than 90 wt % and still more preferably equal to or more than 95 wt % of the fluid hydrocarbon feed boils in the range from equal to or more than 150° C. to equal to or less than 600° C. at a pressure of 1 bar absolute (0.1 MegaPascal), as measured by means of a distillation by ASTM D86 titled "Standard Test Method for Distillation of Petroleum Products at Atmospheric Pressure", respectively as measured by on ASTM D1160 titled "Standard Test Method for Distillation of Petroleum Products at Reduced Pressure.

The composition of the fluid hydrocarbon feed may vary widely. The fluid hydrocarbon feed may for example contain paraffins (including naphthenes), olefins and aromatics.

Preferably the fluid hydrocarbon feed comprises in the range from equal to or more than 50 wt %, more preferably from equal to or more than 75 wt %, and most preferably from equal to or more than 90 wt % to equal to or less than 100 wt % of compounds consisting only of carbon and hydrogen, based on the total weight of the fluid hydrocarbon feed.

More preferably the fluid hydrocarbon feed comprises equal to or more than 1 wt % paraffins, more preferably equal to or more than 5 wt % paraffins, and most preferably equal to or more than 10 wt % paraffins, and preferably equal to or less than 100 wt % paraffins, more preferably equal to or less than 90 wt % paraffins, and most preferably equal to or less than 30 wt % paraffins, based on the total fluid hydrocarbon feed. By paraffins all of normal-, cyclo- and branched-paraffins are understood.

In another embodiment the fluid hydrocarbon feed comprises or consists of a paraffinic fluid hydrocarbon feed. By a paraffinic fluid hydrocarbon feed is herein understood a fluid hydrocarbon feed comprising in the range from at least 50 wt % of paraffins, preferably at least 70 wt % of paraffins, and most preferably at least 90 wt % paraffins, up to and including 100 wt % paraffins, based on the total weight of the fluid hydrocarbon feed.

For practical purposes the paraffin content of all fluid hydrocarbon feeds having an initial boiling point of at least 260° C. can be measured by means of ASTM method D2007-03 titled "Standard test method for characteristic groups in rubber extender and processing oils and other petroleum-derived oils by clay-gel absorption chromatographic method", wherein the amount of saturates will be representative for the paraffin content. For all other fluid hydrocarbon feeds the paraffin content of the fluid hydrocarbon feed can be measured by means of comprehensive multi-dimensional gas chromatography (GC×GC), as described in P. J. Schoenmakers, J. L. M. M. Oomen, J. Blomberg, W. Genuit, G. van Velzen, J. Chromatogr. A, 892 (2000) p. 29 and further.

Examples of paraffinic fluid hydrocarbon feeds include so-called Fischer-Tropsch derived hydrocarbon streams such as described in WO2007/090884 and herein incorporated by reference, or a hydrogen rich feed like hydrotreater product or hydrowax. By Hydrowax is understood the bottoms fraction of a hydrocracker. Examples of hydrocracking processes which may yield a bottoms fraction that can be used as fluid hydrocarbon feed, are described in EP-A-699225, EP-A-649896, WO-A-97/18278, EP-A-705321, EP-A-994173 and U.S. Pat. No. 4,851,109 and herein incorporated by reference.

By "Fischer-Tropsch derived hydrocarbon stream" is meant that the hydrocarbon stream is a product from a Fischer-Tropsch hydrocarbon synthesis process or derived from such product by a hydroprocessing step, i.e. hydrocracking, hydro-isomerisation and/or hydrogenation.

The Fischer-Tropsch derived hydrocarbon stream may suitably be a so-called syncrude as described in for example GB-A-2386607, GB-A-2371807 or EP-A-0321305. Other suitable Fischer-Tropsch hydrocarbon streams may be hydrocarbon fractions boiling in the naphtha, kerosene, gas oil, or wax range, as obtained from the Fischer-Tropsch hydrocarbon synthesis process, optionally followed by a hydroprocessing step.

The weight ratio of the solid biomass material to fluid hydrocarbon feed may vary widely. For ease of co-processing the weight ratio of fluid hydrocarbon feed to solid biomass material is preferably equal to or more than 50 to 50 (5:5), more preferably equal to or more than 70 to 30 (7:3), still more preferably equal to or more than 80 to 20 (8:2), even still more preferably equal to or more than 90 to 10 (9:1). For practical purposes the weight ratio of fluid hydrocarbon feed to solid biomass material is preferably equal to or less than 99.9 to 0.1 (99.9:0.1), more preferably equal to or less than 95 to 5 (95:5). The fluid hydrocarbon feed and the solid biomass material are preferably being fed to the riser reactor in a weight ratio within the above ranges.

If a fluid hydrocarbon feed is present, the amount of solid biomass material, based on the total weight of solid biomass material and fluid hydrocarbon feed supplied to the riser reactor, is preferably equal to or less than 30 wt %, more preferably equal to or less than 20 wt %, most preferably equal to or less than 10 wt % and even more preferably equal to or less than 5 wt %. For practical purposes the amount of solid biomass material present, based on the total weight of solid biomass material and fluid hydrocarbon feed supplied to the riser reactor, is preferably equal to or more than 0.1 wt %, more preferably equal to or more than 1 wt %.

In a preferred embodiment the fluid hydrocarbon feed comprises equal to or more than 8 wt % elemental hydrogen (i.e. hydrogen atoms), more preferably equal to or more than 12 wt % elemental hydrogen, based on the total fluid hydrocarbon feed on a dry basis (i.e. water-free basis). A high content of elemental hydrogen, such as a content of equal to or more than 8 wt %, allows the hydrocarbon feed to act as a hydrogen donor in the catalytic cracking process. A particularly preferred fluid hydrocarbon feed having an elemental hydrogen content of equal to or more than 8 wt % is Fischer-Tropsch derived waxy raffinate. Such Fischer-Tropsch derived waxy raffinate may for example comprise about 85 wt % of elemental carbon and 15 wt % of elemental hydrogen.

Without wishing to be bound by any kind of theory it is further believed that a higher weight ratio of fluid hydrocarbon feed to solid biomass material enables more upgrading of the solid biomass material by hydrogen transfer reactions.

The solid biomass material is contacted with the catalytic cracking catalyst in an internal riser reactor.

By a riser reactor is herein understood an elongated, preferably essentially tube-shaped, reactor suitable for carrying out catalytic cracking reactions. Suitably a fluidized catalytic cracking catalyst flows in the riser reactor from the upstream end to the downstream end of the reactor. The elongated, preferably essentially tube-shaped, reactor is preferably oriented in an essentially vertical manner. Preferably a fluidized catalytic cracking catalyst flows from the bottom of the riser reactor upwards to the top of the riser reactor.

By an internal riser reactor is herein understood a riser reactor that is at least partly situated within a vessel. Preferably the internal riser reactor is oriented in an essentially vertical manner.

More preferably an internal riser reactor is herein understood to be an essentially vertical, preferably essentially tube-shaped, reactor, that has an essentially vertical upstream end located outside a vessel and an essentially vertical downstream end located inside a vessel. The downstream end of the internal riser reactor that is located inside the vessel preferably comprises equal to or more than 30%, more preferably equal to or more than 40%, still more preferably equal to or more than 50% and most preferably equal to or more than 70% of the total length of the riser reactor.

The vessel may suitably be a reactor vessel suitable for catalytic cracking reactions. In a preferred embodiment the vessel comprises one or more cyclone separators and/or swirl tubes. Preferably the internal riser reactor terminates inside the vessel and more preferably the only outlets of the internal riser reactor are fluidly connected to one or more cyclone separators and/or swirl tubes located inside the vessel.

The internal riser reactor preferably enters the vessel in the lowest half of the vessel, more preferably the lowest quarter of the vessel. The internal riser reactor may enter the vessel from the side or from the bottom, and preferably enters the vessel from the bottom. In a most preferred embodiment the internal riser reactor may enter a reaction vessel suitable for catalytic cracking reactions at a section of the vessel that is used for stripping of products.

It is also possible for the internal riser reactor to be part of a so-called U-bend. In such a case one leg of the U-bend may be used as standpipe and the other leg of the U-bend may be used as internal riser reactor. For example, regenerated catalyst may flow from a catalyst regenerator into an inlet at the upstream top of the U-bend downwardly through the bend and subsequently upwardly to the outlet at the downstream top of the U-bend.

Preferably the internal riser reactor is part of a catalytic cracking unit (i.e. as a catalytic cracking reactor), more preferably a fluidized catalytic cracking (FCC) unit.

The internal riser reactor may comprise several sections of different diameter. Preferably the internal riser reactor comprises a pipe herein also referred to as riser reactor pipe. At the bottom of the internal riser reactor further a bottom section may be present (herein also referred to as "liftpot"), which bottom section preferably has a larger diameter than the riser reactor pipe. Hence, in a preferred embodiment the internal riser reactor comprises a riser reactor pipe and a bottom section, which bottom section has a diameter that is larger than the diameter of the riser reactor pipe.

Where applicable, a diameter is herein understood to refer to the inner diameter, as for example the inner (i.e. the internal) diameter of the bottom section or riser reactor pipe. Suitably the inner diameter of the most downstream part of the bottom section is larger than the inner diameter of the most upstream part of the riser reactor pipe. That is, at the connection between the bottom section and the riser reactor pipe, the inner diameter of the bottom section is suitably larger than the inner diameter of the riser reactor pipe. Preferably, the maximum inner diameter of the bottom section is larger than the maximum inner diameter of the riser reactor pipe.

Preferably the riser reactor pipe is fluidly connected to the bottom section. More preferably the riser reactor pipe is fluidly connected at its upstream end to the bottom section.

When introducing the solid biomass material at such a bottom section of an internal riser reactor, the increased diameter at the bottom advantageously allows one to increase the residence time of the solid biomass material at that part of the internal riser reactor. In addition, it allows the solid biomass material to take advantage of the high temperature of the catalytic cracking catalyst at that location of the internal riser reactor.

In a further preferred embodiment the internal riser reactor pipe may have a diameter that increases in a downstream direction to allow for the increasing gas volume generated during the conversion of the solid biomass material. The increase of diameter may be intermittent, resulting in two or more sections of the riser reactor pipe having a fixed diameter, where each preceding section has a smaller diameter than the subsequent section, when going in a downstream direction; the increase of diameter may be gradual, resulting in a gradual increase of the riser reactor pipe diameter in a downstream direction; or the increase in diameter may be a mixture of gradual and intermittent increases.

The length of the internal riser reactor may vary widely. For practical purposes the riser reactor preferably has a length in the range from equal to or more than 10 meters, more preferably equal to or more than 15 meters and most preferably equal to or more than 20 meters, to equal to or less than 65 meters, more preferably equal to or less than 55 meters and most preferably equal to or less than 45 meters.

Examples of suitable riser reactors are described in the Handbook titled "Fluid Catalytic Cracking technology and operations", by Joseph W. Wilson, published by PennWell Publishing Company (1997), chapter 3, especially pages 101 to 112, herein incorporated by reference; in the Handbook titled "Fluid Catalytic Cracking; Design, Operation, and Troubleshooting of FCC Facilities" by Reza Sadeghbeigi, published by Gulf Publishing Company, Houston Tex. (1995), especially page 5; in the handbook titled "Fluid Catalytic Cracking: Science and Technology", by J. S. Magee and M. M. Mitchell, Jr., published by Elsevier (1993), especially page 391, and for example US 2009/0283445.

In the process according to the invention the solid biomass material is preferably supplied to the internal riser reactor at a location upstream of the location where any fluid hydrocarbon feed (if present) is supplied. Without wishing to be bound by any kind of theory it is believed that this allows the solid biomass material to be contacted with the catalytic cracking catalyst first; allowing the solid biomass material to be converted into an intermediate oil product and allowing this intermediate oil product to be at least partly and preferably wholly vaporized before the catalytic cracking catalyst is quenched by addition of a fluid hydrocarbon feed.

In a preferred embodiment the solid biomass material is supplied to the internal riser reactor in the most upstream half, more preferably in the most upstream quarter, and even more preferably at the most upstream tenth of the riser reactor. Most preferably solid biomass material is supplied to the internal riser reactor at the bottom of this reactor. Addition of the solid biomass material in the upstream part, preferably the bottom, of the reactor may advantageously result in in-situ water formation at the upstream part, preferably the bottom, of the reactor. The in-situ water formation may lower the hydrocarbon partial pressure and reduce second order hydrogen transfer reactions, thereby resulting in higher olefin yields. Preferably the hydrocarbon partial pressure is lowered to a pressure in the range from 0.3 to 3.3 bar absolute (0.03 to 0.33 MegaPascal); more preferably to a pressure in the range from 0.5 to 2.8 bar absolute (0.05 to 0.28 MegaPascal); still more preferably to a pressure in the range from 0.7 to 2.8 bar absolute (0.07 to 0.28 MegaPascal); and most preferably to a pressure in the range from 1.2 to 2.8 bar absolute (0.12 to 0.28 MegaPascal).

It may be advantageous to also add a lift gas at the bottom of the internal riser reactor. Examples of such a liftgas include steam, vaporized oil and/or oil fractions, and mixtures thereof. Steam is most preferred as a lift gas from a practical perspective. However, the use of a vaporized oil and/or oil fraction (preferably vaporized liquefied petroleum gas, gasoline, diesel, kerosene or naphtha) as a liftgas may have the advantage that the liftgas can simultaneously act as a hydrogen donor and may prevent or reduce coke formation. In an especially preferred embodiment both steam as well as vaporized oil and/or a vaporized oil fraction (preferably liquefied petroleum gas, vaporized gasoline, diesel, kerosene or naphtha) are used as a liftgas. Most preferably the liftgas consists of steam.

If the solid biomass material is supplied at the bottom of the internal riser reactor, is may optionally be mixed with such a lift gas before entry in the riser reactor. If the solid biomass material is not mixed with the liftgas prior to entry into the internal riser reactor it may be fed simultaneously with the liftgas (at one and the same location) to the internal riser reactor, and optionally mixed upon entry of the internal riser reactor; or it may be fed separately from any liftgas (at different locations) to the internal riser reactor.

When both solid biomass material and steam are introduced into the bottom of the internal riser reactor, the steam-to-solid biomass material weight ratio is preferably in the range from equal to or more than 0.01:1, more preferably equal to or more than 0.05:1 to equal to or less than 5:1, more preferably equal to or less than 1.5:1.

Preferably the temperature in the internal riser reactor ranges from equal to or more than 450° C., more preferably from equal to or more than 480° C., to equal to or less than 800° C., more preferably equal to or less than 750° C.

More preferably the temperature at the location where the solid biomass material is supplied to the internal riser reactor lies in the range from equal to or more than 500° C., more preferably equal to or more than 550° C., and most preferably equal to or more than 600° C., to equal to or less than 800° C., more preferably equal to or less than 750° C.

Preferably the pressure in the internal riser reactor ranges from equal to or more than 0.5 bar absolute to equal to or less than 10 bar absolute (0.05 MegaPascal-1.0 MegaPascal), more preferably from equal to or more than 1.0 bar absolute to equal to or less than 6 bar absolute (0.1 MegaPascal to 0.6 MegaPascal).

Residence time as referred to in this patent application is based on the vapour residence at outlet conditions, that is, residence time includes not only the residence time of a specified feed (such as the solid biomass material) but also the residence time of its conversion products.

When the solid biomass material has a mean particle size in the range from 100 micrometer to 1000 micron, the total average residence time of the solid biomass material most preferably lies in the range from equal to or more than 1 to equal to or less than 2.5 seconds.

When the solid biomass material has a mean particle size in the range from 30 micrometer to 100 micrometer the total average residence time of the solid biomass material most preferably lies in the range from equal to or more than 0.1 to equal to or less than 1 seconds.

The weight ratio of catalyst to feed (that is the total feed of solid biomass material and, if present, any fluid hydrocarbon feed)—herein also referred to as catalyst:feed ratio—preferably lies in the range from equal to or more than 1:1, more preferably from equal to or more than 2:1 and most preferably from equal to or more than 3:1 to equal to or less than 150:1, more preferably to equal to or less than 100:1, most preferably to equal to or less than 50:1. Further preferably the weight ratio of catalyst to solid biomass material (catalyst: solid biomass material ratio) at the location where the solid biomass material is supplied to the internal riser reactor preferably lies in the range from equal to or more than 1:1, more preferably equal to or more than 2:1 to equal to or less than 100:1, more preferably equal to or less than 50:1.

In a preferred embodiment any fluid hydrocarbon feed may be introduced to the catalytic cracking reactor at a location where the solid biomass material already had a residence time in the range from equal to or more than 0.01 seconds, more preferably from equal to or more than 0.05 seconds, and most preferably from equal to or more than 0.1 seconds to equal to or less than 2 seconds, more preferably to equal to or less than 1 seconds, and most preferably to equal to or less than 0.5 seconds.

In another preferred embodiment the solid biomass material is introduced to the riser reactor at a location with temperature T1 and any fluid hydrocarbon feed is introduced to the riser reactor at a location with temperature T2 and temperature T1 is higher than temperature T2. Preferably both T1 and T2 are equal to or more than 400° C., more preferably equal to or more than 450° C.

The solid biomass material and, if present, the fluid hydrocarbon feed can be supplied to the riser reactor in any manner known to the person skilled in the art. Preferably, however the solid biomass material is supplied to the riser reactor with the help of a screw feeder.

The catalytic cracking catalyst can be any catalyst known to the skilled person to be suitable for use in a cracking process. Preferably, the catalytic cracking catalyst comprises a zeolitic component. In addition, the catalytic cracking catalyst can contain an amorphous binder compound and/or a filler. Examples of the amorphous binder component include silica, alumina, titania, zirconia and magnesium oxide, or combinations of two or more of them. Examples of fillers include clays (such as kaolin).

The zeolite is preferably a large pore zeolite. The large pore zeolite includes a zeolite comprising a porous, crystalline aluminosilicate structure having a porous internal cell structure on which the major axis of the pores is in the range of 0.62 nanometer to 0.8 nanometer. The axes of zeolites are depicted in the 'Atlas of Zeolite Structure Types', of W. M. Meier, D. H. Olson, and Ch. Baerlocher, Fourth Revised Edition 1996, Elsevier, ISBN 0-444-10015-6. Examples of such large pore zeolites include FAU or faujasite, preferably synthetic faujasite, for example, zeolite Y or X, ultra-stable zeolite Y (USY), Rare Earth zeolite Y (=REY) and Rare Earth USY (REUSY). According to the present invention USY is preferably used as the large pore zeolite.

The catalytic cracking catalyst can also comprise a medium pore zeolite. The medium pore zeolite that can be used according to the present invention is a zeolite comprising a porous, crystalline aluminosilicate structure having a porous internal cell structure on which the major axis of the pores is in the range of 0.45 nanometer to 0.62 nanometer. Examples of such medium pore zeolites are of the MFI structural type, for example, ZSM-5; the MTW type, for example, ZSM-12; the TON structural type, for example, theta one; and the FER structural type, for example, ferrierite. According to the present invention, ZSM-5 is preferably used as the medium pore zeolite.

According to another embodiment, a blend of large pore and medium pore zeolites may be used. The ratio of the large pore zeolite to the medium pore size zeolite in the cracking catalyst is preferably in the range of 99:1 to 70:30, more preferably in the range of 98:2 to 85:15.

The total amount of the large pore size zeolite and/or medium pore zeolite that is present in the cracking catalyst is preferably in the range of 5 wt % to 40 wt %, more preferably in the range of 10 wt % to 30 wt %, and even more preferably in the range of 10 wt % to 25 wt % relative to the total mass of the catalytic cracking catalyst.

Preferably, the solid biomass material and any optional fluid hydrocarbon feed are contacted in a cocurrent flow configuration with the catalytic cracking catalyst in the internal riser reactor.

In a preferred embodiment the process according to the invention comprises:
a catalytic cracking step comprising contacting the solid biomass material and optionally the fluid hydrocarbon feed with a catalytic cracking catalyst at a temperature of more than 400° C. in an internal riser reactor to produce one or more cracked products and a spent catalytic cracking catalyst; a separation step comprising separating the one or more cracked products from the spent catalytic cracking catalyst; a regeneration step comprising regenerating spent catalytic cracking catalyst to produce a regenerated catalytic cracking catalyst, heat and carbon dioxide; and
a recycle step comprising recycling the regenerated catalytic cracking catalyst to the catalytic cracking step.

The catalytic cracking step is preferably carried out as described herein before. In the internal riser reactor the solid biomass material is contacted with the catalytic cracking catalyst.

The separation step is preferably carried out with the help of one or more cyclone separators and/or one or more swirl tubes. Suitable ways of carrying out the separation step are for example described in the Handbook titled "Fluid Catalytic Cracking; Design, Operation, and Troubleshooting of FCC Facilities" by Reza Sadeghbeigi, published by Gulf Publishing Company, Houston Tex. (1995), especially pages 219-223 and the Handbook "Fluid Catalytic Cracking technology and operations", by Joseph W. Wilson, published by PennWell Publishing Company (1997), chapter 3, especially pages 104-120, and chapter 6, especially pages 186 to 194, herein incorporated by reference. The cyclone separators are preferably operated at a velocity in the range from 18 to 80 meters/second, more preferably at a velocity in the range from 25 to 55 meters/second.

In addition the separation step may further comprise a stripping step. In such a stripping step the spent catalyst may be stripped to recover the products absorbed on the spent catalyst before the regeneration step. These products may be recycled and added to the cracked product stream obtained from the catalytic cracking step.

The regeneration step preferably comprises contacting the spent catalytic cracking catalyst with an oxygen containing gas in a regenerator at a temperature of equal to or more than 550° C. to produce a regenerated catalytic cracking catalyst, heat and carbon dioxide. During the regeneration coke, that can be deposited on the catalyst as a result of the catalytic cracking reaction, is burned off to restore the catalyst activity.

The oxygen containing gas may be any oxygen containing gas known to the skilled person to be suitable for use in a regenerator. For example the oxygen containing gas may be air or oxygen-enriched air. By oxygen enriched air is herein understood air comprising more than 21 vol. % oxygen ($O_2$), more preferably air comprising equal to or more than 22 vol. % oxygen, based on the total volume of air.

The heat produced in the exothermic regeneration step is preferably employed to provide energy for the endothermic catalytic cracking step. In addition the heat produced can be used to heat water and/or generate steam. The steam may be used elsewhere in the refinery, for example as a liftgas in the riser reactor.

Preferably the spent catalytic cracking catalyst is regenerated at a temperature in the range from equal to or more than 575° C., more preferably from equal to or more than 600° C., to equal to or less than 950° C., more preferably to equal to or less than 850° C. Preferably the spent catalytic cracking catalyst is regenerated at a pressure in the range from equal to or more than 0.5 bar absolute to equal to or less than 10 bar absolute (0.05 MegaPascal to 1 MegaPascal), more preferably from equal to or more than 1.0 bar absolute to equal to or less than 6 bar absolute (0.1 MegaPascal to 0.6 MegaPascal).

The regenerated catalytic cracking catalyst can be recycled to the catalytic cracking step. In a preferred embodiment a side stream of make-up catalyst is added to the recycle stream to make-up for loss of catalyst in the reaction zone and regenerator.

In the process according to the invention one or more cracked products are produced. In a preferred embodiment this/these one or more cracked products is/are subsequently fractionated to produce one or more product fractions.

As indicated herein, the one or more cracked products may contain one or more oxygen-containing-hydrocarbons. Examples of such oxygen-containing-hydrocarbons include ethers, esters, ketones, acids and alcohols. In specific the one or more cracked products may contain phenols.

Fractionation may be carried out in any manner known to the skilled person in the art to be suitable for fractionation of products from a catalytic cracking unit. For example the fractionation may be carried out as described in the Handbook titled "Fluid Catalytic Cracking technology and operations", by Joseph W. Wilson, published by PennWell Publishing Company (1997), pages 14 to 18, and chapter 8, especially pages 223 to 235, herein incorporated by reference.

The one or more product fractions may contain one or more oxygen-containing-hydrocarbons. Examples of such oxygen-containing-hydrocarbons include ethers, esters, ketones, acids and alcohols. In specific one or more product fractions may contain phenols and/or substituted phenols.

In a further embodiment at least one of the one or more product fractions obtained by fractionation are subsequently hydrodeoxygenated to produce a hydrodeoxygenated product fraction. This/these hydrodeoxygenated product fraction(s) may be used as biofuel and/or biochemical component(s).

By hydrodeoxygenation is herein understood reducing the concentration of oxygen-containing hydrocarbons in one or more product fraction(s) containing oxygen-containing hydrocarbons by contacting the one or more product fraction(s) with hydrogen in the presence of a hydrodeoxygenation catalyst. Oxygen-containing hydrocarbons that can be removed include acids, ethers, esters, ketones, aldehydes, alcohols (such as phenols) and other oxygen-containing compounds.

The hydrodeoxygenation preferably comprises contacting of the one or more product fractions with hydrogen in the presence of an hydrodeoxygenation catalyst at a temperature in the range from equal to or more than 200° C., preferably equal to or more than 250° C., to equal to or less than 450° C., preferably equal to or less than 400° C.; at a total pressure in the range of equal to or more than 10 bar absolute (1 MegaPascal) to equal to or less than 350 bar absolute (35 MegaPascal); and at a partial hydrogen pressure in the range of equal to or more than 5 bar absolute (0.5 MegaPascal) to equal to or less than 350 bar absolute (35 MegaPascal).

The hydrodeoxygenation catalyst can be any type of hydrodeoxygenation catalyst known by the person skilled in the art to be suitable for this purpose.

The hydrodeoxygenation catalyst preferably comprises one or more hydrodeoxygenation metal(s), preferably supported on a catalyst support.

Most preferred are hydrodeoxygenation catalysts comprising Rhodium on alumina ($Rh/Al_2O_3$), Rhodium-Cobalt on alumina ($RhCo/Al_2O_3$), Nickel-Copper on alumina ($NiCu/Al_2O_3$), Nickel-Tungsten on alumina ($NiW/Al_2O_3$), Cobalt-Molybdenum on alumina ($CoMo/Al_2O_3$) or Nickel-Molybdenum on alumina ($NiMo/Al_2O_3$).

If the one or more product fractions also contain one or more sulphur-containing hydrocarbons it may be advantageous to use a sulphided hydrodeoxygenation catalyst. If the hydrodeoxygenation catalyst is sulphided the catalyst may be sulphided in-situ or ex-situ.

In addition to the hydrodeoxygenation, the one or more product fractions may be subjected to hydrodesulphurization, hydrodenitrogenation, hydrocracking and/or hydroisomerization. Such hydrodesulphurization, hydrodenitrogenation, hydrocracking and/or hydroisomerization may be carried out before, after and/or simultaneously with the hydrodeoxygenation.

In a preferred embodiment the one or more product fractions produced in the fractionation; and/or the one or more hydrodeoxygenated product(s) produced in the hydrodeoxygenation can be blended as a biofuel component and/or a biochemical component with one or more other components to produce a biofuel and/or a biochemical. Examples of one or more other components with which the one or more hydrodeoxygenated product(s) may be blended include anti-oxidants, corrosion inhibitors, ashless detergents, dehazers, dyes, lubricity improvers and/or mineral fuel components, but also conventional petroleum derived gasoline, diesel and/or kerosene fractions.

Alternatively the one or more product fractions and/or the one or more hydrodeoxygenated product(s) can be used as an intermediate in the preparation of a biofuel component and/or a biochemical component. In such a case the biofuel component and/or biochemical component may be subsequently blended with one or more other components (as listed above) to prepare a biofuel and/or a biochemical.

By a biofuel respectively a biochemical is herein understood a fuel or a chemical that is at least partly derived from a renewable energy source.

Figure 1:
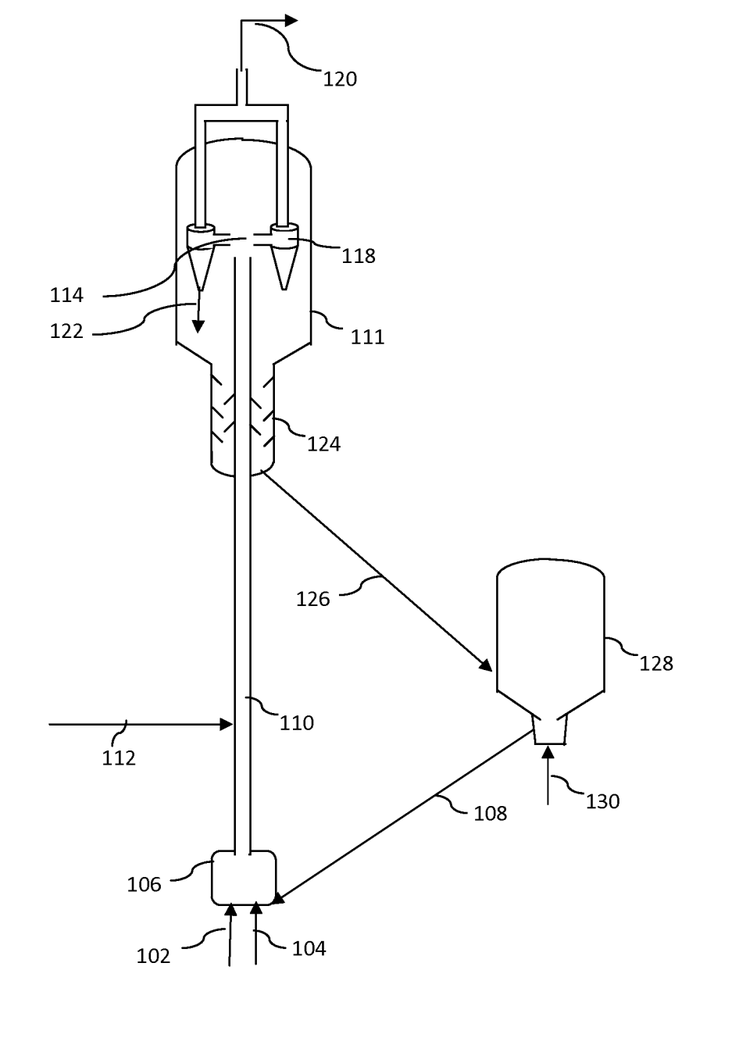
FIG. 1 shows a schematic diagram of a process according to the invention.

In FIG. 1 one embodiment according to the invention is illustrated. In FIG. 1, a feed of solid biomass material (102) and a steam feed (104) are both introduced into the bottom (106) of an internal reactor riser (110). The top of the essentially vertical reactor riser is located within a reactor vessel (111). The reactor vessel (111) comprises two or more cyclone separators (118) and a stripper section (124). In the bottom (106) of the internal reactor riser (110), the solid biomass material (102) and the steam feed (104) are mixed with hot regenerated catalytic cracking catalyst (108). The mixture of catalytic cracking catalyst (108), solid biomass material (102) and steam feed (104) is forwarded into the internal riser reactor (110). After about 0.1 seconds of residence time of the solid biomass material (102) in the internal reactor riser (110), a fluid hydrocarbon feed (112) is introduced into the internal riser reactor (110). In the internal reactor riser (110) the solid biomass material (102) and the additional fluid hydrocarbon feed (112) are catalytically cracked to produce one or more cracked products. The mixture (114) of one or more cracked products, catalytic cracking catalyst, steam, and any residual non-cracked solid biomass material and fluid hydrocarbon feed is forwarded from the top of the riser reactor (110) into two or more close-coupled cyclone separators (118). Cracked products (120) are retrieved via the top of the cyclone separators (118) and optionally forwarded to a fractionator (not shown). Spent catalytic cracking catalyst (122) is retrieved from the bottom of the cyclone separators (118) and forwarded to a stripper section (124) where further cracked products are stripped off the spent catalytic cracking catalyst (122). The spent and stripped catalytic cracking catalyst (126) is forwarded to a regenerator (128), where the spent catalytic cracking catalyst (126) is contacted with air (130) to produce a hot regenerated catalytic cracking catalyst (108) that can be recycled to the bottom (106) of the reactor riser (110).

What is claimed is:

1. A process for converting a solid biomass material comprising contacting the solid biomass material with a catalytic cracking catalyst at a temperature of more than 400° C. in a riser reactor to produce a reaction product comprising at least one cracked product, wherein the riser reactor is an internal riser reactor, wherein the internal riser reactor is an essentially vertical reactor comprising an essentially vertical upstream end located outside a vessel and an essentially vertical downstream end located inside the vessel and wherein the riser reactor comprises a riser reactor pipe having a diameter that increases in a downstream direction; and providing the reaction product to two or more cyclone separators in the vessel.

2. The process of claim 1 wherein the solid biomass material is fed to the riser reactor as a mixture of solid biomass material and steam.

3. The process of claim 1 wherein a fluid hydrocarbon feed is also fed into the riser reactor and wherein the solid biomass material is supplied to the riser reactor at a location upstream of the location where the fluid hydrocarbon feed is supplied to the riser reactor.

4. The process of claim 1 wherein solid biomass material is supplied at the bottom of the riser reactor.

5. The process of claim 1 wherein the riser reactor comprises a bottom section and a riser reactor pipe and wherein the bottom section has a larger diameter than the riser reactor pipe.

6. The process of claim 1 wherein the weight ratio of catalyst to solid biomass material (catalyst:solid biomass ratio) at the location where the solid biomass material is supplied to the riser reactor lies in the range from equal to or more than 1:1, to equal to or less than 150:1.

7. The process of claim 1 wherein the fluid hydrocarbon feed is introduced to the riser reactor at a location where the solid biomass material already had a residence time in the range from equal to or more than 0.1 seconds to equal to or less than 1 seconds.

8. The process of claim 1 wherein the ratio between the residence time for the solid biomass material to the residence time for the fluid hydrocarbon feed (residence solid biomass:residence hydrocarbon ratio) lies in the range from equal to or more than 1.01:1 to equal to or less than 2:1.

9. The process of claim 1 wherein the solid biomass material is introduced to the riser reactor at a location with temperature T1 and the fluid hydrocarbon feed is introduced to the riser reactor at a location with temperature T2 and temperature T1 is higher than temperature T2.

10. A process for the preparation of a biofuel component and/or biochemical component comprising the process of claim 1.

11. A process to produce a biofuel and/or biochemical by blending a biofuel and/or biochemical component produced by the process of claim 10 with one or more other components to produce the biofuel and/or biochemical.

* * * * *